United States Patent [19]

Brooks

[11] Patent Number: 4,838,296
[45] Date of Patent: Jun. 13, 1989

[54] MOISTURE SENSING SWITCH

[76] Inventor: James L. Brooks, 903 Sandpiper Pl., La Jolla, Calif. 92037

[21] Appl. No.: 187,743

[22] Filed: May 2, 1988

[51] Int. Cl.$^4$ .............................................. A01G 25/16
[52] U.S. Cl. ................................ 137/78.3; 137/624.11
[58] Field of Search ........................... 137/78.3, 624.11; 239/63, 64, 70

[56] References Cited

U.S. PATENT DOCUMENTS

| | | | |
|---|---|---|---|
| 4,304,989 | 12/1981 | Vos et al. | 137/624.2 |
| 4,657,039 | 4/1987 | Bireley et al. | 137/78.3 |
| 4,693,419 | 9/1987 | Weintraub et al. | 137/78.3 |
| 4,718,446 | 1/1988 | Simpson | 137/78.3 |

Primary Examiner—A. Michael Chambers
Attorney, Agent, or Firm—Thomas J. Tighe

[57] ABSTRACT

A sensor disposed in the ground has a characteristic which changes generally predictably in relation to the moisture content of the ground. A signal is produced by a circuit during a period of energization whenever the characteristic of the sensor is at or beyond a threshold. The signal, once produced, is held during said period of energization, the energy being provided by a source of periodic energization for a solenoid driven water valve. A gate passes the periodic energization to the solenoid whenever said signal is present. When the periodic energization ceases, said signal ceases and the water valve closes. If the characteristic of the sensing element is not at or beyond said threshold during a period of energization, said energization is not gated to the water valve solenoid and the water valve remains closed.

16 Claims, 1 Drawing Sheet

U.S. Patent   Jun. 13, 1989   4,838,296
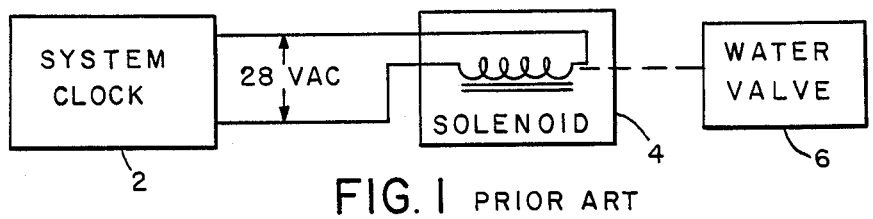
FIG. 1 PRIOR ART
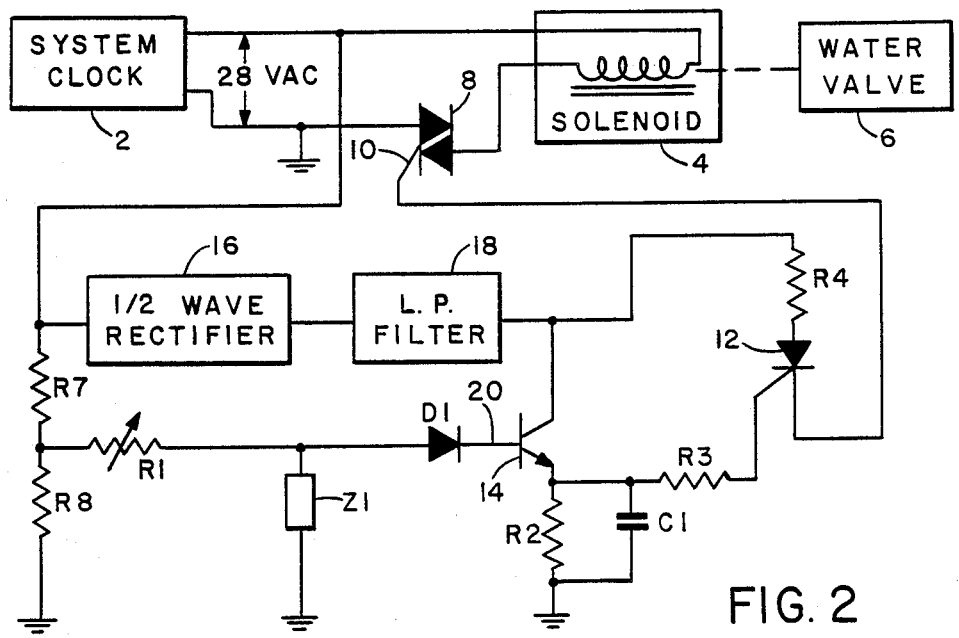
FIG. 2
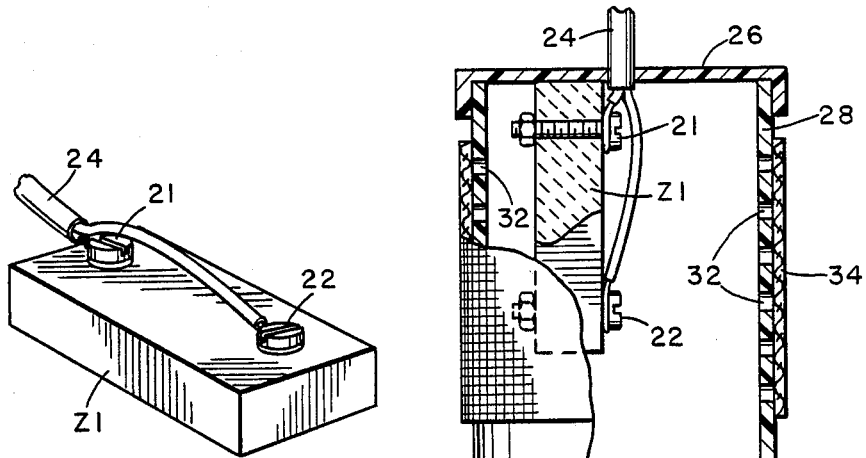
FIG. 3
FIG. 4

MOISTURE SENSING SWITCH

BACKGROUND OF THE INVENTION

This invention relates in general to means for sensing moisture in soil and closing or opening a path of conduction depending upon the amount of moisture in the soil with respect to a threshold level. In particular, this invention relates to moisture sensing switches for controlling sprinkler systems.

The prior art discloses various circuits for controlling watering systems.

U.S. Pat. No. 4,333,490 discloses a circuit for controlling a watering system in response to ambient conditions. It discloses light and humidity sensors which are resistance varying devices, the variations of which are amplified. It also discloses a timer. Note, however, that it does not disclose a ground sensor.

U.S. Pat. No. 2,599,862 discloses a water control system with a ground probe which supposedly measures the resistance of the soil. However, only a single element ground probe is disclosed.

U.S. Pat. No. 2,578,981 presents another electronic control system with a ground probe. This probe, however, comprises two twelve inch copper electrodes spaced apart in the soil. They sense the variation in resistance of the soil due to moisture in the soil.

U.S. Pat. No. 2,611,643 presents another circuit using ground buried electrodes to measure the resistivity of the soil itself.

U.S. Pat. No. 2,674,490 presents a porous cup which measures moisture tension in the soil. The cup and the tube to which it is attached must be filled with water initially in order to operate.

U.S. Pat. No. 3,500,844 shows an above-ground sensor having a mesh through which moisture passes to provide a conducting path between sensing elements.

U.S. Pat. No. 2,989,667 presents a clock circuit which has terminals adapted to be coupled to moisture sensing, resistance varying sensor. This patent, however, does not disclose such a sensor.

U.S. Pat. No. 3,024,372 presents a clock timer circuit which utilizes a ground varied sensor. The sensor is characterized but it is not disclosed in detail.

U.S. Pat. No. 3,915,185 presents the unique packaging scheme for a clock and solenoid valve, but it discloses no ground moisturizing system.

Other advantages and attributes to this invention will be readily discernible upon reading the text hereinafter.

SUMMARY

The preferred embodiment of this invention discloses a moisture sensing device retrofittable on an existing sprinkler system controlled by a clock which periodically distributes a 28 volt AC signal to various solenoids in the sprinkler system. The 28 volts AC is reduced, preferably by a resistive voltage divider circuit. A reduced AC voltage is communicated to a sensor voltage divider circuit comprising a variable resistor in series with a ceramic sensing element which is disposed in the soil. The voltage across the sensing element is an alternating voltage as will be explained. That voltage is communicated to the base of an amplifier, configured as an emitter-follower amplifier, through a rectifying diode. The voltage developed across the sensing element has an inverse relationship with the moisture in the soil. When the voltage developed across the sensing element exceeds a threshold set by a biasing circuit in the emitter circuit of the amplifier, the amplifier will produce a signal sufficient to trigger an SCR. The current through the SCR is communicated to the gate of a triac. Said current will enable the triac to conduct alternating current due to the latching of the SCR. The triac will continue to conduct until the 28 volt AC from the system clock is removed. The triac is in series with the energizing circuit of a solenoid which controls a waver valve. When the triac conducts, the solenoid is energized and the water valve is opened. When the triac ceases conduction due to the removal of the SCR current and the zero crossing off the 28 volts AC, the solenoid will be deenergized and the water valve will be closed.

An object of this invention is to provide a moisture controlled switch for preventing the energization of a water valve solenoid in a soil sprinkler system when there is sufficient moisture in the soil and no need to provide more water.

Other objects of this invention will be readily discernible upon the remainder of the text hereinafter.

BRIEF DESCRIPTION OF THE DRAWINGS

FIG. 1 is a schematic of a prior art watering system.

FIG. 2 is a schematic of the prior art watering system of FIG. 1 retrofitted by this invention.

FIG. 3 is a perspective view of a moisture sensing element.

FIG. 4 is a side elevation view, partially cut away, of an assembled sensing unit.

DESCRIPTION OF THE PREFERRED EMBODIMENT

Referring to FIG. 1, prior art watering system has a clocking device which selectively applies 28 volts AC to the energizing coil one of a typical plurality of solenoids 4. The movement of the solenoid plunger (not shown) opens a water valve 6. As long as the clocking device 2 applies the 28 volts AC via two wires to the solenoid, the water valve will remain open and water will flow through water conduits (not shown) associated with the water valve 6.

Referring to FIG. 2, it can be seen that one wire of the 28 volts AC from the clock 2 to the solenoid 4 coil is interrupted by a triac 8 in series with the solenoid coil. The conduction of the triac 8 is controlled by electrical current selectively applied to the triac's gate 10. When a sufficient amount of gate current is applied, the triac will turn on and pass alternating current to the solenoid coil. When the gate current falls below a threshold, the triac will turn off at the next zero crossing of the 28 volts AC and thereby inhibit current to the solenoid coil.

The gate 10 current is applied to the triac 8 whenever an SCR 12 is conducting. The SCR is energized by a generally DC voltage from a halfwave rectifier 16 with an associated low pass filter 18. The SCR is primarily a current amplifier which receives a signal from a sensor amplifier 14 which is illustrated as an NPN transistor configured as an emitter-follower. A base 20 of the amplifier 14 receives a signal developed by a sensing circuit.

Referring again to FIG. 2, the sensing circuit comprises a series voltage dividing network comprising a variable resistor R1 and a sensor Z1 which is disposed in the soil. The divider network receives a voltage (VZ) and divides it according to well known principles between the variable resistor R1 and the sensor Z1. As illustrated in FIG. 2, the voltage (VZ) is an alternating voltage derived from the divider network of R7 and R8. However, the voltage could be a direct voltage taken from the filter 18 output. A symmetrically alternating voltage is preferred because it has been found that the ceramic material used for the sensor has some amount of charge storing capacity, and a direct voltage would create in the sensor an offset potential which would effectively move the threshold point of the circuit. A symmetrically alternating voltage avoids such an offset. The voltage developed across the sensor Z1 is communicated to the base of transistor 14 through a diode D1. The diode D1 simply insures that the base 20 of transistor 14 receives current of the proper polarity.

In practice, the voltage developed across the sensor Z1 has an inverse relationship with the amount of moisture in the soil. As the moisture in the soil decreases, the impedance of the sensor increases and therefore the voltage developed across the sensor increases. The voltage developed across the sensor is applied to the base of the transistor 14 and said transistor, configured and operating as an emitter-follower current amplifier, develops said voltage across R2 less a couple of diode voltage drops. When the voltage developed across R2 goes beyond a trigger threshold of the SCR, the SCR is triggered into its conduction mode. The conducting SCR supplies sufficient current to the gate of the triac to cause it to enter its conduction mode. The SCR remains latched in its conduction mode easily until the 28 VAC from the system clock 2 is removed. The latching holds the water valve open for the full watering cycle even if the sensor becomes flooded with water. This is advantageous in situations where the sensor can become quickly flooded but other areas still need water. The voltage VZ across the sensor divider network is a fraction of the 28 volt AC. It is fractionalized by a series voltage divider comprising R7 and R8 in series across the 28 volt AC hot and return lines.

Referring again to FIG. 2, the emitter resistor R2 of the transistor 14 sets the bias level of the isolation amplifier, that is, the threshold. The series resistor R3 between the emitter transistor 14 and the gate of the SCR 12 is a current limiting resistor. The capacitor C1 across the emitter resistor R2 is a high frequency by-pass.

Referring to FIG. 3, a sensing element Z1 is illustrated as a block of ceramic material with two spaced terminals, 21 and 22. One of the terminals is electrically connected to the ground of the circuit illustrated in FIG. 2, and the other terminal is electrically connected as shown in FIG. 2, both connections via two-wire cable 24.

Referring to FIG. 4, the ceramic block Z1 illustrated in FIG. 3 is shown to be affixed at one end to a cap 26, with the two-wire cable 24 projecting through the cap. Preferably the block is made from a clay-based product called SOLEDAD from Free Form Clay Products Co. of Santee, Calif. The cap 26 seals an open-top end of an enclosure 28, preferably the enclosure is cylindrical with the cap being round. The base of the enclosure 28 has a plurality of drain holes 30 for allowing water to freely drain from the enclosure. The wall of the enclosure defines a plurality of holes 32 radially distributed completely around the wall. The holes provide access to ground moisture such that the atmospheric environment within the container reaches an equilibrium with the moisture in the ground. A sleeve 34 completely covers the wall holes 32. The sleeve is made from chamis-like material which is porous to moisture. The sleeve allows the moisture to pass through it and enter the container, but blocks the passage of the soil itself.

The preceding description has been for illustrative purposes only and no unnecessary limitations in claims which follow should be derived therefrom.

I claim:

1. In a ground watering system including a water valve means which opens when energized and a means for periodically providing energization for said water valve means, the improvement comprising:
    (a) a sensing element disposed in the ground, said element having at least one characteristic which changes generally predictably in relation to changes in the moisture content of an atmosphere ambient to said sensing element,
    (b) means for isolating the sensing element from the ground, said isolation means being permeable to air and moisture,
    (c) means for producing a signal whenever said characteristic of the sensing element is at or beyond a threshold and the periodic energization is present, said signal remaining for the duration of said periodic energization, and
    (d) means for communicating the periodic energization to the water valve means in response to and for the duration of said signal.

2. The improvement according to claim 1 wherein the sensing element comprises a ceramic element.

3. The improvement in a ground watering system according to claim 1 wherein a characteristic of the sensing element which changes generally predictably in relation to changes in the moisture content of an atmosphere ambient to said sensing element is electrical impedance of the sensing element.

4. The improvement in a ground watering system according to claim 3 wherein the sensing element is a block of ceramic material adapted to absorb moisture from the air, the amount of moisture absorbed being in relation to the amount of water vapor present in the air, the electrical impedance of the block being in relation to the amount of moisture absorbed by the block.

5. The improvement in a ground watering system according to claim 4 the means for producing the signal comprises:
    (a) a means for measuring the electrical impedance of the sensing element over a selected range, the range having a selected threshold, and
    (b) a memory means for remembering the first occurrence of the sensing element's measured electrical impedance exceeding the threshold, and for producing a continuous signal thereafter until said memory means is cleared.

6. The improvement in a ground watering system according to claim 5 wherein the means for measuring electrical impedance comprises a voltage divider element, the voltage being a symmetrically alternating current voltage.

7. A ground watering system comprising:
    (a) at least one valve means for permitting communication of water to a water distribution network whenever said valve means is energized and inhibiting said communication of water otherwise,
    (b) a means for periodically providing energization for the water valve means,
    (c) a sensing element disposed in the ground, said element having at least one characteristic which changes generally predictably in relation to changes in the moisture content of an atmosphere ambient to said sensing element,
(d) means for isolating the sensing element from the ground, said isolation means being permeable to air and moisture,
(e) means for producing a signal whenever said characteristic of the sensing element is at or beyond a threshold and the periodic energization is present, said signal remaining for the duration of said periodic energization, and
(f) a means for gating said periodic energization to said water valve means in response to and for the duration of said signal.

8. The watering system according to claim 7 wherein the sensing element comprises a ceramic element.

9. The ground watering system according to claim 7 wherein a characteristic of the sensing element which changes generally predictably in relation to changes in the moisture content of an atmosphere ambient to said sensing element is electrical impedance of the sensing element.

10. The ground watering system according to claim 9 wherein the sensing element is a block of ceramic material adapted to absorb moisture from the air, the amount of moisture absorbed being in relation to the amount of water vapor present in the air, the electrical impedance of the block being in relation to the amount of moisture absorbed by the block.

11. The ground watering system according to claim 10 the means for producing the signal comprises:
(a) a means for measuring the electrical impedance of the sensing element over a selected range, the range having a selected threshold, and
(b) a memory means for remembering the first occurrence of the sensing element's measured electrical impedance exceeding the threshold, and for producing a continuous signal thereafter until said memory means is cleared.

12. The ground watering system according to claim 11 wherein the means for measuring electrical impedance comprises a voltage divider network in which the sensing element is a voltage dividing element, the voltage being a symmetrically alternating current voltage.

13. A system for controlling the communication of water to a water distribution network which irrigates a water permeable medium comprising:
(a) at least one valve means for permitting said communication of water to said water distribution network whenever said valve means is energized and inhibiting said communication of water otherwise,
(b) a means for energizing said valve means,
(c) means for gating the energization to said valve means in response to a signal,
(d) means for defining a water permeable, closed chamber within said water permeable medium, the chamber being generally devoid of any of said medium and having a gaseous atmosphere therein which has a capacity for water vapor,
(e) means disposed in the chamber for sensing the amount of water vapor present in the atmosphere of said chamber, and
(f) means for producing said gating signal whenever the amount of water vapor sensed is below a selected threshold amount.

14. The system according to claim 13 wherein the sensing means is a block of ceramic material adapted to absorb moisture from the atmosphere, the amount of moisture absorbed being in relation to the amount of water vapor present in the atmosphere, the electrical impedance of the block being in relation to the amount of moisture absorbed by the block.

15. The system according to claim 14 wherein the means for producing the signal comprises:
(a) a means for measuring the electrical impedance of the sensing means over a selected range, the range having a selected threshold, and
(b) a memory means for remembering the first occurrence of the sensing means' measured electrical impedance exceeding the threshold, and for producing a continuous signal thereafter until said memory means is cleared.

16. The ground watering system according to claim 15 wherein the means for measuring electrical impedance comprises a voltage divider network in which the sensing means is a voltage dividing element, the voltage being a symmetrically alternating current voltage.

* * * * *

UNITED STATES PATENT AND TRADEMARK OFFICE
CERTIFICATE OF CORRECTION

PATENT NO. : 4,838,296
DATED : June 13, 1989
INVENTOR(S) : James L. Brooks

It is certified that error appears in the above-identified patent and that said Letters Patent is hereby corrected as shown below:

Column 4, claim 6, line 56 after "divider" insert

--network in which the sensing element is a voltage dividing--;

Signed and Sealed this

Fifth Day of December, 1989

Attest:

JEFFREY M. SAMUELS

Attesting Officer     Acting Commissioner of Patents and Trademarks